(12) United States Patent
Zhang et al.

(10) Patent No.: US 12,083,421 B2
(45) Date of Patent: Sep. 10, 2024

(54) FORCE FEEDBACK APPARATUS

(71) Applicant: AAC Acousitc Technologies (Shanghai)Co., Ltd., Shanghai (CN)

(72) Inventors: Lijin Zhang, Shenzhen (CN); Bing Xie, Shenzhen (CN); Liang Jiang, Shenzhen (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 341 days.

(21) Appl. No.: 17/743,483

(22) Filed: May 13, 2022

(65) Prior Publication Data

US 2023/0277926 A1    Sep. 7, 2023

(30) Foreign Application Priority Data

Mar. 2, 2022 (CN) .......................... 202220441910.3

(51) Int. Cl.
*A63F 13/285* (2014.01)
*A63F 13/24* (2014.01)

(52) U.S. Cl.
CPC ............ *A63F 13/285* (2014.09); *A63F 13/24* (2014.09)

(58) Field of Classification Search
None
See application file for complete search history.

(56) References Cited

U.S. PATENT DOCUMENTS

| 11,275,443 B1* | 3/2022 | Tu .......................... A63F 13/218 |
| 2003/0030619 A1* | 2/2003 | Martin .................. A63F 13/218 345/156 |
| 2018/0050270 A1* | 2/2018 | Castleman ............ A63F 13/335 |

* cited by examiner

*Primary Examiner* — Jason T Yen
(74) *Attorney, Agent, or Firm* — W&G Law Group

(57) ABSTRACT

Provided is a force feedback apparatus, including a rotation shaft, a force feedback module fixed to the rotation shaft, and a trigger movably connected to the rotation shaft. The force feedback module includes a housing fixed to the rotation shaft and having a first opening and a force feedback assembly received in the housing. The force feedback assembly includes a sliding block, an ejector pin, a first driving element, a second driving element, and a transmission portion fixed to the sliding block and extending through the first opening to abut against the trigger. The first driving element interacts with the second driving element to drive the ejector pin to drive the transmission portion to move to realize force feedback on the trigger. The force feedback apparatus requires no additional transmission structure and directly provides force feedback for the trigger in a timely manner, thereby reducing the assembly difficulty.

9 Claims, 3 Drawing Sheets

100

A-A

FORCE FEEDBACK APPARATUS

TECHNICAL FIELD

The present invention relates to the field of human-computer interaction, and in particular, to a force feedback apparatus applied to human-computer interaction devices.

BACKGROUND

In recent years, with the continuous development of peripherals such as all kinds of game controlling handles, toy guns, virtual reality devices, and augmented reality devices, a haptic feedback technology has been widely used in all kinds of devices such as game controlling handles, and has achieved excellent user experience effects and market responses. However, in some game scenarios, vibration feelings alone cannot meet experience requirements. In this case, better immersion feelings can be achieved if force feedback is further provided, such as in scenarios where recoil or force is required (e.g., archery, racing, and rocket scenarios). Therefore, there is a need to design a force feedback module, which can meet requirements on vibration feedback while providing force feedback.

A force feedback apparatus in the related art is realized mainly by a motor driving a worm, a gear, and so on. Specifically, when the motor is energized, the worm rotates and then converts the force into a linear directional force through conversion of the gear, so as to push a trigger. After power is off, a torsion spring can retreat the trigger to an initial position. However, the force feedback apparatus in the related art is complicated in assembly, and there is a need to convert a rotating force into a linear directional force by the worm and the gear. The force on the trigger is in only one direction, and the forces in two directions cannot be achieved. In addition, a rotational speed of the trigger is reduced while force of the motor is amplified by a reduction gear, thereby affecting the timeliness of the force feedback and degrading user experience.

Therefore, there is a need to provide an improved force feedback apparatus to solve the above problems.

SUMMARY

Based on the above problems, the present invention provides a force feedback apparatus with simple assembly and a better force feedback performance.

Specifically, the present invention proposes a solution as follows.

Provided is a force feedback apparatus, including a rotation shaft, a force feedback module fixed to the rotation shaft, and a trigger movably connected to the rotation shaft and movable relative to the force feedback module. The force feedback module includes a housing fixed to the rotation shaft and having a receiving space, and a force feedback assembly received in the receiving space; an end of the housing toward the trigger is provided with a first opening; the force feedback assembly includes a sliding block slidably connected to the housing, an ejector pin connected to the sliding block, a first driving element fixed to the ejector pin, a second driving element fixed to the housing and arranged corresponding to the first driving element, and a transmission portion fixed to the sliding block and extending through the first opening to abut against the trigger; and the first driving element interacts with the second driving element to drive the ejector pin to drive the transmission portion to move, so as to realize force feedback on the trigger.

In an improved embodiment, the force feedback assembly further includes a reset spring arranged between the sliding block and the second driving element, the reset spring is spaced from the ejector pin and sleeved on an outer side of the ejector pin, and the reset spring has an end connected to a side of the sliding block toward the second driving element and another end connected to a side of the second driving element toward the sliding block.

In an improved embodiment, the first driving element is a permanent magnet, and the second driving element is a coil.

In an improved embodiment, the force feedback apparatus further includes a sensing permanent magnet fixed to the trigger and a hall sensor fixed to the housing and arranged corresponding to the sensing permanent magnet, and the hall sensor is configured to sense displacement of the sensing permanent magnet.

In an improved embodiment, the transmission portion extends to be fixed to the trigger.

In an improved embodiment, the first driving element is of a ring-shaped structure, and the first driving element is sleeved on the ejector pin.

In an improved embodiment, the second driving element is of a ring-shaped structure, and the second driving element is spaced from the first driving element and sleeved on an outer side of the first driving element.

In an improved embodiment, the housing is provided with two first fixing portions spaced from each other, each of the two first fixing portions is provided with a first fixing hole, and the rotation shaft is fixed to the two first fixing portions through the first fixing hole provided at each of the two first fixing portions.

In an improved embodiment, the trigger is provided with two second fixing portions spaced from each other, each of the two second fixing portions is provided with a second fixing hole, the rotation shaft passes through the second fixing hole provided at each of the two second fixing portions to allow the trigger to be rotatable relative to the rotation shaft, and the two second fixing portions are arranged between the two first fixing portions.

The force feedback apparatus according to the present invention includes a rotation shaft, a force feedback module fixed to the rotation shaft, and a trigger movably connected to the rotation shaft and movable relative to the force feedback module. The force feedback module includes a housing fixed to the rotation shaft and having a first opening, and a force feedback assembly received in the housing. The force feedback assembly includes a sliding block slidably connected to the housing, an ejector pin connected to the sliding block, a first driving element fixed to the ejector pin, a second driving element fixed to the housing and arranged corresponding to the first driving element, and a transmission portion fixed to the sliding block and extending through the first opening to abut against the trigger. The first driving element interacts with the second driving element to drive the ejector pin to drive the transmission portion to move, so as to realize force feedback on the trigger. The force feedback apparatus according to the present invention requires no additional transmission structure and directly provides force feedback through interaction between two driving elements, thereby realizing timely force feedback on the trigger and also reducing the assembly difficulty while simplifying the structure. In addition, forces in two directions can be directly generated on the trigger by changing a driving current, thereby enriching a force feedback mode of the force feedback apparatus and effectively improving user experience.

DESCRIPTION OF EMBODIMENTS

The technical solution of the present invention is clearly and completely described below with reference to the accompanying drawings and embodiments.

Figure 1:
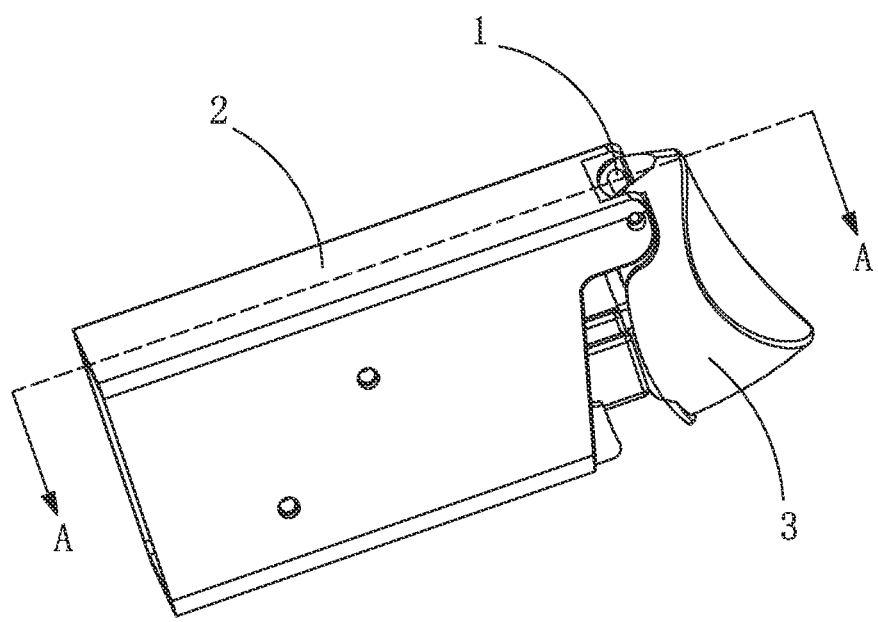
FIG. 1 is a three-dimensional view of a force feedback apparatus according to an embodiment of the present invention.
Figure 2:
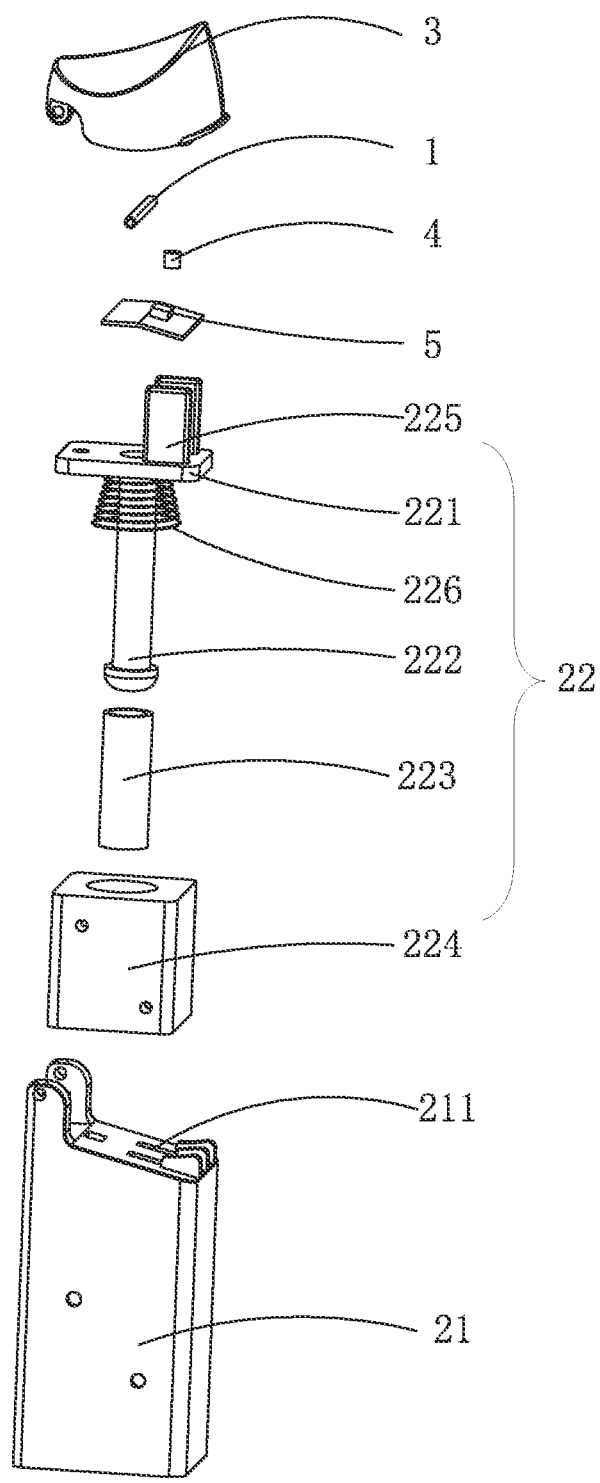
FIG. 2 is an exploded view of a force feedback apparatus according to an embodiment of the present invention.
Figure 3:
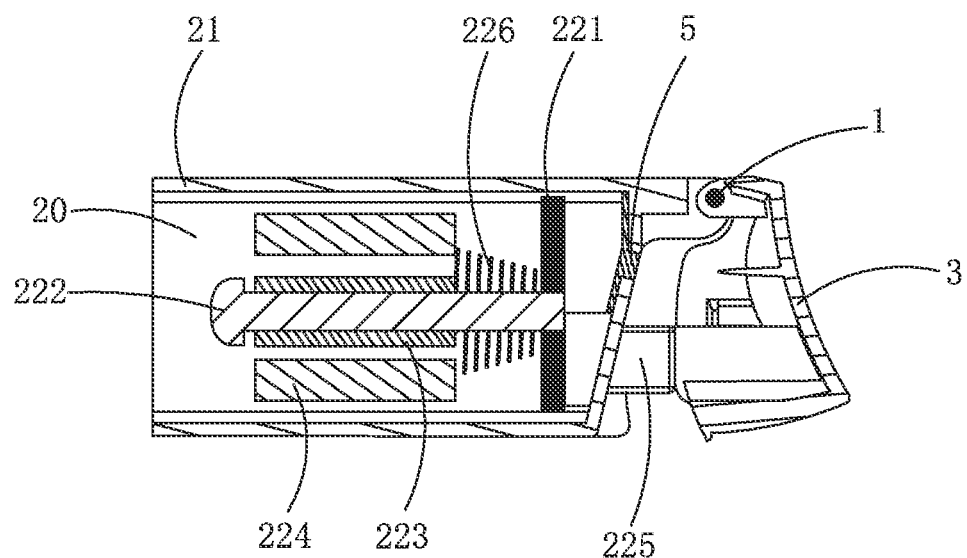
FIG. 3 is a sectional view taken along A-A shown in FIG. 1.

As shown in FIG. 1 to FIG. 3, the present invention provides a force feedback apparatus 100. The force feedback apparatus 100 includes a rotation shaft 1, a force feedback module 2 fixed to the rotation shaft 1, and a trigger 3 movably connected to the rotation shaft 1. The trigger 3 is rotatable relative to the rotation shaft 1. Since the force feedback module 2 is fixed to the rotation shaft 1, the trigger 3 is movable relative to the force feedback module 2.

The force feedback module 2 includes a housing 21 fixed to the rotation shaft 1 and having a receiving space 20, and a force feedback assembly 22 received in the receiving space 20. Specifically, in order to realize transmission connection between the force feedback assembly 22 and the trigger 3, an end of the housing 21 toward the trigger 3 is provided with a first opening 211, and the force feedback assembly 22 includes a sliding block 221 slidably connected to the housing 21, an ejector pin 222 connected to the sliding block 221, a first driving element 223 fixed to the ejector pin 222, a second driving element 224 fixed to the housing 21 and arranged corresponding to the first driving element 223, and a transmission portion 225 fixed to the sliding block 221 and extending through the first opening 211 to abut against the trigger 3. In addition, the force feedback assembly 22 further includes a reset spring 226 arranged between the sliding block 221 and the second driving element 224. The reset spring 226 is spaced from ejector pin 222 and sleeved on an outer side of the ejector pin 222, The reset spring 226 has an end connected to a side of the sliding block 221 toward the second driving element 224, and another end connected to a side of the second driving element 224 toward the sliding block 221. The first driving element 223 is a permanent magnet, and the second driving element 224 is a coil. The first driving element 223 interacts with the second driving element 224 to drive the ejector pin 222 to drive the transmission portion 225 to move, so as to realize force feedback on the trigger 3.

Figure 4:
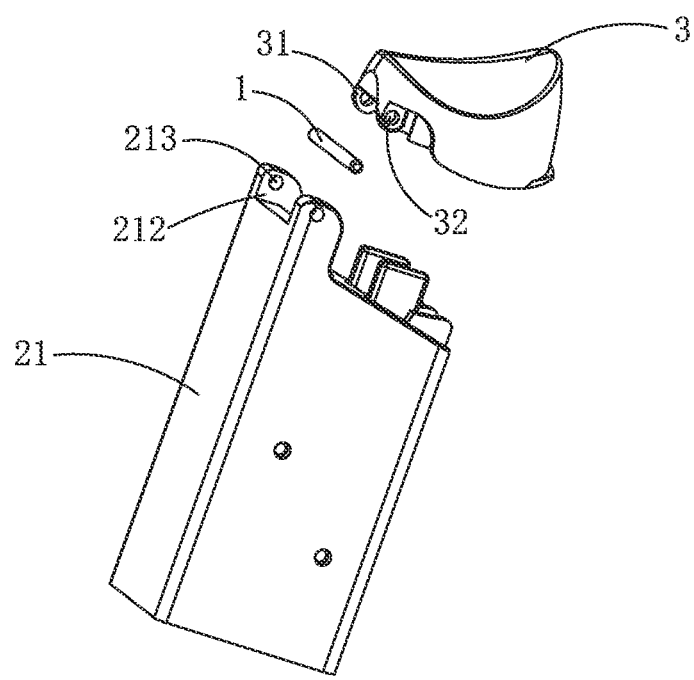
FIG. 4 is a partial three-dimensional view of a force feedback apparatus according to an embodiment of the present invention.

As shown in FIG. 4, the housing 21 is provided with two first fixing portions 212 spaced from each other. Each of the two first fixing portions 212 is provided with a first fixing hole 213, and the rotation shaft 1 is fixed to the two first fixing portions 212 through the first fixing hole 213 provided at each of the two first fixing portions 212. In addition, the trigger 3 is provided with two second fixing portions 31 spaced from each other. Each of the two second fixing portions 31 is provided with a second fixing hole 32, and the rotation shaft 1 passes through the second fixing hole 32 provided at each of the two second fixing portions 31 to allow the trigger 3 to be rotatable relative to the rotation shaft 1. In this embodiment, the second fixing portion 31 is arranged between the two first fixing portions 212 and spaced from the two first fixing portions 212.

The force feedback apparatus 100 according to the present invention is further provided with a sensing permanent magnet 4 fixed to the trigger 3, and a hall sensor 5 fixed to the housing 21. The hall sensor 5 is arranged corresponding to the sensing permanent magnet 4 to sense displacement of the sensing permanent magnet 4. An operating principle of the force feedback apparatus 100 is briefly described below.

When a user presses the trigger 3, the trigger 3 undergoes a force and then may rotate relative to the rotation shaft 1, and the sensing permanent magnet 4 on the trigger may change its position. Moreover, due to relative displacement between the trigger 3 and the force feedback module 1, the hall sensor 5 can read position information of the trigger 3 by monitoring position information of the sensing permanent magnet 4, so as to input electrical signals, which generate vibration or force feedback, to the second driving element 224.

After the second driving element 224 is energized, the first driving element 223 on the ejector pin 222 is subjected to an ampere force to drive the ejector pin 222 and the sliding block 221 to reciprocate toward the trigger 3 and away from the trigger 3. When the sliding block 221 moves toward the trigger 3, the transmission portion 225 connected to the sliding block 221 also moves toward the trigger 3 to abut against the trigger 3 to generate force feedback. When an energization direction of the second driving element 224 changes, the ejector pin 222 drives the sliding block 221 and the transmission portion 225 to reciprocate to produce vibration sensation. It may be understood that the transmission portion 225 connected to the sliding block 221 may also be fixedly connected to the trigger 3. In this case, forces in two directions, i.e., a force to pull the trigger 3 or a push the trigger 3, can be applied to the trigger 3 by changing the energization direction of the second driving element 224. After the second driving element 224 is powered off, the reset spring 226 can bring the trigger 3 back to an initial position, thereby resetting the trigger 3.

In the force feedback apparatus 100, the first driving element 223 is of a ring-shaped hollow structure, so that the first driving element 223 can be sleeved on an outer side of the ejector pin 222. In addition, the second driving element 224 is also of a ring-shaped hollow structure, and the second driving element 224 is spaced from the first driving element 223 and sleeved on an outer side of the first driving element 223, so that the first driving element 223 and the ejector pin 222 are movable inside the second driving element 224.

The force feedback apparatus according to the present invention includes a rotation shaft, a force feedback module fixed to the rotation shaft, and a trigger movably connected to the rotation shaft and movable relative to the force feedback module. The force feedback module includes a housing fixed to the rotation shaft and having a first opening, and a force feedback assembly received in the housing. The force feedback assembly includes a sliding block slidably connected to the housing, an ejector pin connected to the sliding block, a first driving element fixed to the ejector pin, a second driving element fixed to the housing and arranged corresponding to the first driving element, and a transmission portion fixed to the sliding block and extending through the first opening to abut against the trigger. The first driving element interacts with the second driving element to drive the ejector pin to drive the transmission portion to move, so as to realize force feedback on the trigger. The force feedback apparatus according to the present invention requires no additional transmission structure and directly provides force feedback through interaction between two driving elements, thereby realizing timely force feedback on the trigger and also reducing the assembly difficulty while simplifying the structure. In addition, forces in two directions can be directly generated on the trigger by changing a driving current, thereby enriching a force feedback mode of the force feedback apparatus and effectively improving user experience.

The above are merely some embodiments of the present invention. It should be pointed out that those of ordinary skill in the art can make improvements without deviating from the creative concept of the present invention, but all of these shall fall within a scope of the present invention.

What is claimed is:

1. A force feedback apparatus, comprising a rotation shaft, a force feedback module fixed to the rotation shaft, and a trigger movably connected to the rotation shaft and movable relative to the force feedback module, wherein the force feedback module comprises a housing fixed to the rotation shaft and having a receiving space, and a force feedback assembly received in the receiving space; an end of the housing toward the trigger is provided with a first opening; the force feedback assembly comprises a sliding block slidably connected to the housing, an ejector pin connected to the sliding block, a first driving element fixed to the ejector pin, a second driving element fixed to the housing and arranged corresponding to the first driving element, and a transmission portion fixed to the sliding block and extending through the first opening to abut against the trigger; and the first driving element interacts with the second driving element to drive the ejector pin to drive the transmission portion to move, so as to realize force feedback on the trigger.

2. The force feedback apparatus as described in claim 1, wherein the force feedback assembly further comprises a reset spring arranged between the sliding block and the second driving element, the reset spring is spaced from the ejector pin and sleeved on an outer side of the ejector pin, and the reset spring has an end connected to a side of the sliding block toward the second driving element and another end connected to a side of the second driving element toward the sliding block.

3. The force feedback apparatus as described in claim 2, wherein the first driving element is a permanent magnet, and the second driving element is a coil.

4. The force feedback apparatus as described in claim 1, wherein the force feedback apparatus further comprises a sensing permanent magnet fixed to the trigger and a hall sensor fixed to the housing and arranged corresponding to the sensing permanent magnet, and the hall sensor is configured to sense displacement of the sensing permanent magnet.

5. The force feedback apparatus as described in claim 4, wherein the transmission portion extends to be fixed to the trigger.

6. The force feedback apparatus as described in claim 3, wherein the first driving element is of a ring-shaped structure, and the first driving element is sleeved on the ejector pin.

7. The force feedback apparatus as described in claim 6, wherein the second driving element is of a ring-shaped structure, and the second driving element is spaced from the first driving element and sleeved on an outer side of the first driving element.

8. The force feedback apparatus as described in claim 7, wherein the housing is provided with two first fixing portions spaced from each other, each of the two first fixing portions is provided with a first fixing hole, and the rotation shaft is fixed to the two first fixing portions through the first fixing hole provided at each of the two first fixing portions.

9. The force feedback apparatus as described in claim 8, wherein the trigger is provided with two second fixing portions spaced from each other, each of the two second fixing portions is provided with a second fixing hole, the rotation shaft passes through the second fixing hole provided at each of the two second fixing portions to allow the trigger to be rotatable relative to the rotation shaft, and the two second fixing portions are arranged between the two first fixing portions.

* * * * *